(12) United States Patent
Crawford, Jr. et al.

(10) Patent No.: US 10,865,585 B1
(45) Date of Patent: Dec. 15, 2020

(54) LIGHTWEIGHT LOAD BEARING INFLATABLE TUBULAR STRUCTURES

(71) Applicants: James A. Crawford, Jr., Charlotte, NC (US); John N. Pepin, Greenville, ME (US)

(72) Inventors: James A. Crawford, Jr., Charlotte, NC (US); John N. Pepin, Greenville, ME (US)

(73) Assignee: Textum Weaving, Inc., Belmont, NC (US)

( * ) Notice: Subject to any disclaimer, the term of this patent is extended or adjusted under 35 U.S.C. 154(b) by 0 days.

(21) Appl. No.: 16/289,089

(22) Filed: Feb. 28, 2019

Related U.S. Application Data

(63) Continuation-in-part of application No. 15/800,546, filed on Nov. 1, 2017, now abandoned.

(51) Int. Cl.
*E04H 15/20* (2006.01)
*F16L 9/19* (2006.01)
*E04B 1/16* (2006.01)

(52) U.S. Cl.
CPC .............. *E04H 15/20* (2013.01); *E04B 1/169* (2013.01); *E04H 2015/201* (2013.01); *F16L 9/20* (2013.01)

(58) Field of Classification Search
CPC ............. E04H 15/20; E04H 2015/201; E04G 11/045; B29C 33/505; F16L 11/20; E04B 1/169; E04C 3/005
See application file for complete search history.

(56) References Cited

U.S. PATENT DOCUMENTS

| | | | | |
|---|---|---|---|---|
| 3,225,413 | A * | 12/1965 | Bird | E04G 11/04 425/438 |
| 4,068,418 | A * | 1/1978 | Masse | E04H 15/20 52/2.21 |
| 5,421,128 | A * | 6/1995 | Sharpless | B64C 3/30 52/2.13 |
| 5,546,707 | A * | 8/1996 | Caruso | A63B 63/004 52/2.13 |
| 5,677,023 | A * | 10/1997 | Brown | E04H 15/20 428/36.6 |
| 6,182,398 | B1 * | 2/2001 | Head | D04C 1/06 52/2.13 |
| 6,260,306 | B1 * | 7/2001 | Swetish | E04H 15/20 135/124 |
| 2006/0148071 | A1 * | 7/2006 | Bauer | E04H 15/20 435/290.1 |
| 2007/0175577 | A1 * | 8/2007 | Dagher | B29C 70/865 156/229 |
| 2007/0251185 | A1 * | 11/2007 | Haggard | E04C 3/005 52/843 |

(Continued)

*Primary Examiner* — Gisele D Ford
(74) *Attorney, Agent, or Firm* — NK Patent Law

(57) ABSTRACT

The subject matter described herein includes a tube for use in creating a support for a roof line of a structure. The tube comprises an inner flexible bladder, a seamless woven cylinder formed from fibers woven to form a seamless tubular arch shape when the cylinder is inflated, the cylinder engaged with the flexible bladder, and an outer weather shield coating engaged with the cylinder, wherein, in operation a plurality of tubes are used to form the roof line of a structure to define a housing for containing an article, wherein the plurality of tubes maintains flexibility so that the plurality of tubes can be inflated, deflated, and re-deployed.

16 Claims, 9 Drawing Sheets

(56) References Cited

U.S. PATENT DOCUMENTS

| | | | | |
|---|---|---|---|---|
| 2009/0249701 | A1* | 10/2009 | Turcot | E04H 15/20 52/2.18 |
| 2011/0011008 | A1* | 1/2011 | Dagher | B29C 33/505 52/2.15 |
| 2011/0221093 | A1* | 9/2011 | Perrow | B29C 70/44 264/255 |
| 2012/0312848 | A1* | 12/2012 | Delusky | B29C 70/446 224/309 |
| 2013/0061898 | A1* | 3/2013 | Webster | E04H 15/008 135/156 |
| 2013/0305619 | A1* | 11/2013 | Turcot | E04C 3/38 52/2.13 |
| 2014/0370206 | A1* | 12/2014 | Head | E04H 15/20 428/12 |
| 2015/0101258 | A1* | 4/2015 | Milo | E04H 15/20 52/2.18 |
| 2015/0298406 | A1* | 10/2015 | Costin | B63B 34/20 428/12 |
| 2016/0305149 | A1* | 10/2016 | Brezan | E04H 15/20 |
| 2017/0058553 | A1* | 3/2017 | Day | E04H 15/20 |
| 2018/0045343 | A1* | 2/2018 | Burrowes | B32B 5/028 |

* cited by examiner

LIGHTWEIGHT LOAD BEARING INFLATABLE TUBULAR STRUCTURES

CROSS REFERENCE TO RELATED APPLICATION

This application is a continuation in part and claims priority to co-pending U.S. Non-Provisional patent application Ser. No. 15/800,546 filed Nov. 1, 2017, the contents of which are hereby incorporated by reference herein.

TECHNICAL FIELD

The presently disclosed subject matter is directed towards a tube for use in creating a support for a roof line of a structure. Specifically the presently disclosed subject matter is directed towards an inflatable tube having a seamless woven middle layer for use in creating a support for a roof line of a structure.

BACKGROUND

Tubular inflated structures are often referred to as airbeams. The load carrying capability of the airbeam is directly related to the internal pressure capability of the tube construction. The higher the internal pressure the tube can withstand, the higher the load carrying capability of the structure.

Several known methods for making reinforced textile arches have been explored with varying degrees of success. One such method has been to use conventional flat fabrics woven on standard looms. These fabrics have 0 and 90 degree fiber orientations before they are bent or inflated. In order to construct a tubular shape, this method requires the use of a sewing technology that creates a seam. The seam will always be a weak area of the tube after inflation. Additionally, and perhaps more importantly, the tube will typically be fabricated as a straight tube and then bent and formed into a semi-circular arch shape. In doing so, the fibers on the inside radius will be kinked and will have a lower load carrying capability than fibers which are not kinked.

Another known method uses braiding technology or braiders to create seamless tubes. Braiders are suited to orient fibers in the hoop direction. Fibers oriented in the hoop direction run generally perpendicular to an imaginary center line, which runs longitudinally through the center of the tube. Braiders are not suited to apply fibers oriented in the axial direction. Fibers oriented in the axial direction run generally parallel to an imaginary center line which runs longitudinally through the center of the tube.

Another known method, in particular, shuttle loom weaving technology, has also been used to make straight, seamless tubular shapes without relying on sewing a seam. This approach is capable of high strength tubes but is limited to straight lengths. Bending these straight tubes into curved shapes introduces kinking at the inside radius of curvature and therefore limits the load carrying capacity.

Previous methods include tensioning the ends of the fabric as a rigidification material such as resin is infused. These previous methods clamp the entire ends at both ends when the tubular mold structure is straight. Forming this mold structure to the shape desired and applying tension will pull on longitudinal fibers on internal side and external side equally. Either external side fibers will break or internal side fibers will buckle.

Another known method is to create curved, seamless tubes using conical shaped loom take-up mandrels. The problem with using the conical take-up mandrel approach is that in the as-woven, un-inflated, condition the inside radius of the curved fabric and the fabric width are determined with conical take up roll dimensions and the weaving width of fabric. The seamless tube is woven in a flattened condition. Take for example a situation where the inner radius of the fabric is about 114 inches and the outer radius of the fabric is 114+16 or about 130 inches. In the flattened tube, after inflation, the inner radius remains at about 114 inches but now the outer radius is 114+10.2 or about 124.2 inches. This means that the axial fibers at the outer radius that were woven in at about 130 inches need only occupy a radius of about 124.2 inches. The fiber lengths will not be correct and therefore will not create a tube with correct inside and outside dimensions when inflated. In addition, the correct arch shape will not be formed. FIG. 1 illustrates an overlapping region 5 that results when tubes are manufactured using conical shaped loom take-up mandrels.

The presently disclosed subject matter provides an improved method for producing reinforcing textile arches that overcomes the disadvantages of the existing methods.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a tube for use in creating a support for a roofline of a structure. The tube includes an inner flexible bladder. The tube also includes a middle reinforcing textile formed from reinforcing textile fibers woven to form a seamless tubular arch shape. The middle reinforcing textile is engaged with the flexible bladder. The tube also includes an outer weather shield coating engaged with the middle reinforcing textile. In operation, a plurality of tubes are used to form the roof line of a structure to define a housing for containing an article.

According to one or more embodiments, the inner flexible bladder is made from a thin elastomeric film capable of stretching while maintaining airtight integrity.

According to one or more embodiments, the middle reinforcing textile is a seamless woven cylinder formed to approximate the arch shape upon inflation.

According to one or more embodiments, the seamless woven cylinder is formed from straight fibers.

According to one or more embodiments, the seamless woven cylinder in an inflated state defines an inside arc radius $R_{ID}$, an outside arc radius of $R_{OD}$, an inner cylinder radius $R_T$, and a distance S along an inside circumference of the seamless woven cylinder in a deflated state.

According to one or more embodiments, the seamless tubular arch shape has at least one arc length (L) determined by an equation $L=\pi(R_{ID}+R_T-R_T \cos(S/R_T))$.

According to one or more embodiments, the outer weather shield coating is made from a polymer to prevent intrusion from dust, dirt, and weather.

According to one or more embodiments, the seamless woven cylinder is made from one or more of the following substances: Fiberglass, Aramid, carbon, ceramic fiber, polyamide nylon, PET or PBT polyester, phenol-formaldehyde (PF), polyvinyl chloride fiber (PVC) vinyon, polyolefins (PP and PE) olefin fiber acrylic polyesters, aromatic polyamids (aramids), Elastomers, polyurethane fiber, Elastolefin, or Coextruded fibers.

According to one or more embodiments is a method of creating a support for a roof line of a structure. The method includes providing a tube having an inner flexible bladder, a middle reinforcing textile formed from reinforcing textile fibers woven to form a seamless tubular arch shape (the middle reinforcing textile is engaged with the flexible bladder), and an outer weather shield coating engaged with the middle reinforcing textile. The method also includes inflating a plurality of tubes and arranging the plurality of tubes to form the roof line of a structure to define a housing for containing an article.

According to one or more embodiments, the inner flexible bladder is made from a thin elastomeric film capable of stretching while maintaining air tight integrity.

According to one or more embodiments, the middle reinforcing textile is a seamless woven cylinder formed to approximate the arch shape upon inflation. The cylinder is formed from fibers which assume a perpendicular orientation upon inflation.

According to one or more embodiments, the seamless woven cylinder is formed from straight fibers.

According to one or more embodiments, the seamless woven cylinder in an inflated state defines an inside arc radius $R_{ID}$, an outside arc radius of $R_{OD}$, an inner cylinder radius $R_T$, and a distance S along an inside circumference of the seamless woven cylinder in a deflated state.

According to one or more embodiments, the seamless tubular arch shape has at least one Arc length (L) determined by an equation $L=\pi(R_{ID}+R_T-R_T \cos(S/R_T))$.

According to one or more embodiments, the outer weather shield coating is made from a polymer to prevent intrusion from dust, dirt, and weather.

According to one or more embodiments, the seamless woven cylinder is made from one or more of the following substances: Fiberglass, Aramid, carbon, ceramic fiber, polyamide nylon, PET or PBT polyester, phenol-formaldehyde (PF), polyvinyl chloride fiber (PVC) vinyon, polyolefins (PP and PE) olefin fiber acrylic polyesters, aromatic polyamids (aramids), Elastomers, polyurethane fiber, Elastolefin, or Coextruded fibers.

According to one or more embodiments, a tube for use in creating a support for a roof line of a structure comprises an inner flexible bladder, a seamless woven cylinder formed from straight, generally perpendicular fibers woven to form a seamless tubular arch shape when the cylinder is inflated, the cylinder engaged with the flexible bladder, and an outer weather shield coating engaged with the seamless woven cylinder, wherein, in operation a plurality of tubes are used to form the roof line of a structure to define a housing for containing an article, wherein the plurality of tubes maintains flexibility so that the plurality of tubes can be inflated, deflated, and re-deployed.

According to one or more embodiments, a method of creating a support for a roof line of a structure includes providing a tube having an inner flexible bladder, a seamless woven cylinder formed from straight, generally perpendicular fibers woven to form a seamless tubular arch shape when the cylinder is inflated, the seamless woven cylinder engaged with the flexible bladder, and an outer weather shield coating engaged with the seamless woven cylinder. The method also includes inflating a plurality of tubes, arranging the plurality of tubes to form the roof line of a structure to define a housing for containing an article, deflating the plurality of tubes, and re-inflating the plurality of tubes.

According to one or more embodiments, a tube for use in creating a support for a roof line of a structure comprises an inner flexible bladder, a seamless woven cylinder formed from fibers woven to form a seamless tubular arch shape when inflated, the fibers approximate a substantially perpendicular orientation when the cylinder is inflated, the cylinder engaged with the flexible bladder, and an outer weather shield coating engaged with the seamless woven cylinder, wherein, in operation a plurality of tubes are used to form the roof line of a structure to define a housing for containing an article, wherein the plurality of tubes maintains flexibility so that the plurality of tubes can be inflated, deflated, and re-deployed.

Disclosed herein is a tube for use in creating a support for a roof line of a structure, the tube comprises an inner flexible bladder, a seamless woven cylinder formed from fibers woven to form a seamless tubular arch shape when the cylinder is inflated, the cylinder engaged with the flexible bladder, and an outer weather shield coating engaged with the cylinder, wherein, in operation a plurality of tubes are used to form the roof line of a structure to define a housing for containing an article, wherein the plurality of tubes maintains flexibility so that the plurality of tubes can be inflated, deflated, and re-deployed.

According to one or more embodiments, the fibers are substantially perpendicular when the cylinder is inflated.

According to one or more embodiments, the fibers assume a substantially perpendicular orientation when the cylinder is inflated.

According to one or more embodiments, the inner flexible bladder is made from a thin elastomeric film capable of stretching while maintaining airtight integrity.

According to one or more embodiments, the inner flexible bladder is fixedly engaged with the cylinder when the cylinder is an inflated state.

According to one or more embodiments, the inner flexible bladder is removable when the cylinder is in a deflated state.

According to one or more embodiments, the seamless woven cylinder in an inflated state defines an inside arc radius $R_{ID}$, an outside arc radius of $R_{OD}$, an inner cylinder radius $R_T$.

According to one or more embodiments, the seamless tubular arch shape has at least one half arc length (L) determined by an equation $L=\pi(R_{ID}+R_T-R_T \cos(S/R_T))$.

According to one or more embodiments, the outer weather shield coating is made from a polymer to prevent intrusion from dust, dirt, and weather.

According to one or more embodiments, the seamless woven cylinder is made from one or more of the following substances: Fiberglass, Aramid, carbon, ceramic fiber, polyamide nylon, PET or PBT polyester, phenol-formaldehyde (PF), polyvinyl chloride fiber (PVC) vinyon, polyolefins (PP and PE) olefin fiber acrylic polyesters, aromatic polyamids (aramids), Elastomers, polyurethane fiber, Elastolefin, or Coextruded fibers.

According to one or more embodiments, a method of creating a support for a roof line of a structure, comprises providing a tube comprising an inner flexible bladder, a seamless woven cylinder formed from fibers woven to form a seamless tubular arch shape when the cylinder is inflated, the seamless woven cylinder engaged with the flexible bladder, and an outer weather shield coating engaged with the cylinder, inflating a plurality of tubes, arranging the plurality of tubes to form the roof line of a structure to define a housing for containing an article, deflating the plurality of tubes, and re-inflating the plurality of tubes.

According to one or more embodiments, the fibers are substantially perpendicular when the cylinder is inflated.

According to one or more embodiments, the inner flexible bladder is made from a thin elastomeric film capable of stretching while maintaining airtight integrity.

According to one or more embodiments, the inner flexible bladder is fixedly engaged with the cylinder when the cylinder is an inflated state.

According to one or more embodiments, the inner flexible bladder is removable when the cylinder is in a deflated state.

According to one or more embodiments, the seamless woven cylinder in an inflated state defines an inside arc radius $R_{ID}$, an outside arc radius of $R_{OD}$, an inner cylinder radius $R_T$.

According to one or more embodiments, a ratio of half arc lengths $L_N$ and $L_{N+1}$ of the tube is proportional to a ratio of diameters $D_{ID}$ and $D_{N+1}$ of a take-up roll configured to create the tube, wherein $L_{N+1}/L_N = D_{N+1}/D_{ID}$, wherein $L_N$ and $L_{N+1}$ can be calculated using a formulae $L = \pi(R_{ID} + R_T - R_T \cos(S/R_T))$, wherein S is a distance between $D_{ID}$ and $D_{N+1}$ along the take-up roll.

According to one or more embodiments, the outer weather shield coating is made from a polymer to prevent intrusion from dust, dirt, and weather.

According to one or more embodiments, the seamless woven cylinder is made from one or more of the following substances: Fiberglass, Aramid, carbon, ceramic fiber, polyamide nylon, PET or PBT polyester, phenol-formaldehyde (PF), polyvinyl chloride fiber (PVC) vinyon, polyolefins (PP and PE) olefin fiber acrylic polyesters, aromatic polyamids (aramids), Elastomers, polyurethane fiber, Elastolefin, or Coextruded fibers.

According to one or more embodiments, a method of designing a take-up roll, configured for manufacturing a tube of predetermined desired dimensions, comprising determining an inside arc radius $R_{ID}$ and an inner cylinder radius $R_T$ of the tube based on desired dimensions of the tube, determining a half arc length L of the tube based on desired dimensions of the tube, calculating S, a distance between two diameters of the take-up roll using an equation $L = \pi(R_{ID} + R_T - R_T \cos(S/R_T))$, calculating $D_{ID}$ and $D_{N+1}$ using an equation $L_{N+1}/L_N = D_{N+1}/D_{ID}$, repeating the calculation for different half arc lengths L of the tube, and designing a take up roll using calculated values of $D_{N+1}$, $D_{ID}$, and their corresponding S values.

According to one or more embodiments, the take-up roll is not conical.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
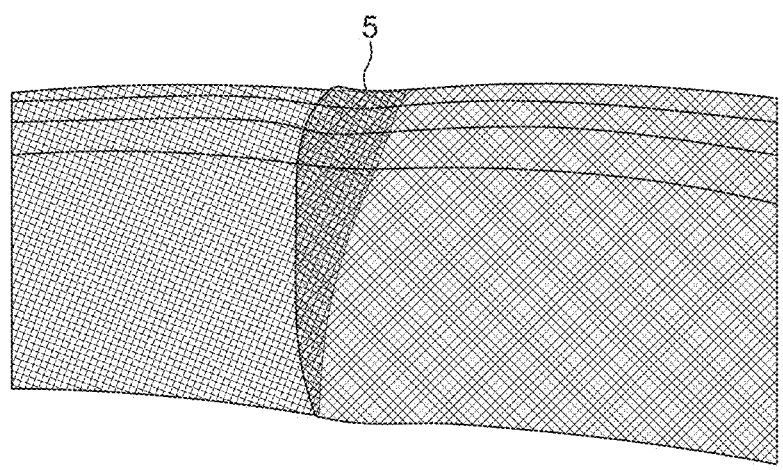
FIG. 1 is an expanded view of an overlapping region that results when tubes are manufactured using previously known methods, according to the teachings of previous manufacturing techniques.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

Lightweight, portable structures are useful for a variety of applications. The technology related to the presently disclosed subject matter addresses light-weight structures that achieve their strength by inflating tubular fabrics. Military applications for these structures are amongst the most sought after. They include temporary shelters for military soldiers, temporary battlefield offices, hangers for aircraft and garages for military vehicles.

The portability and reusability of the lightweight structures, which are the subject matter of the present disclosure, allows them to be used in remote locations where the only access to deliver them might be by aircraft. The structures of the presently disclosed subject matter can be erected with the application of pressurized air. They can be deflated, relocated, and redeployed.

Figure 3:
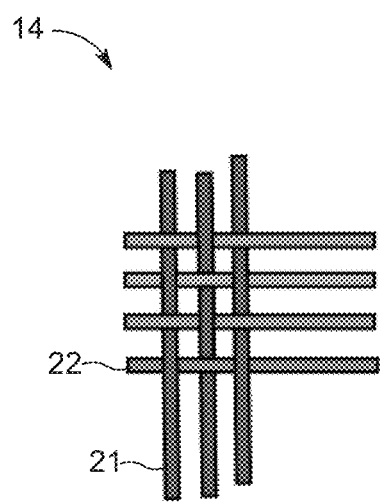
FIG. 3 is an expanded view of perpendicular fibers, according to one or more embodiments of the presently disclosed subject matter.
Figure 4:
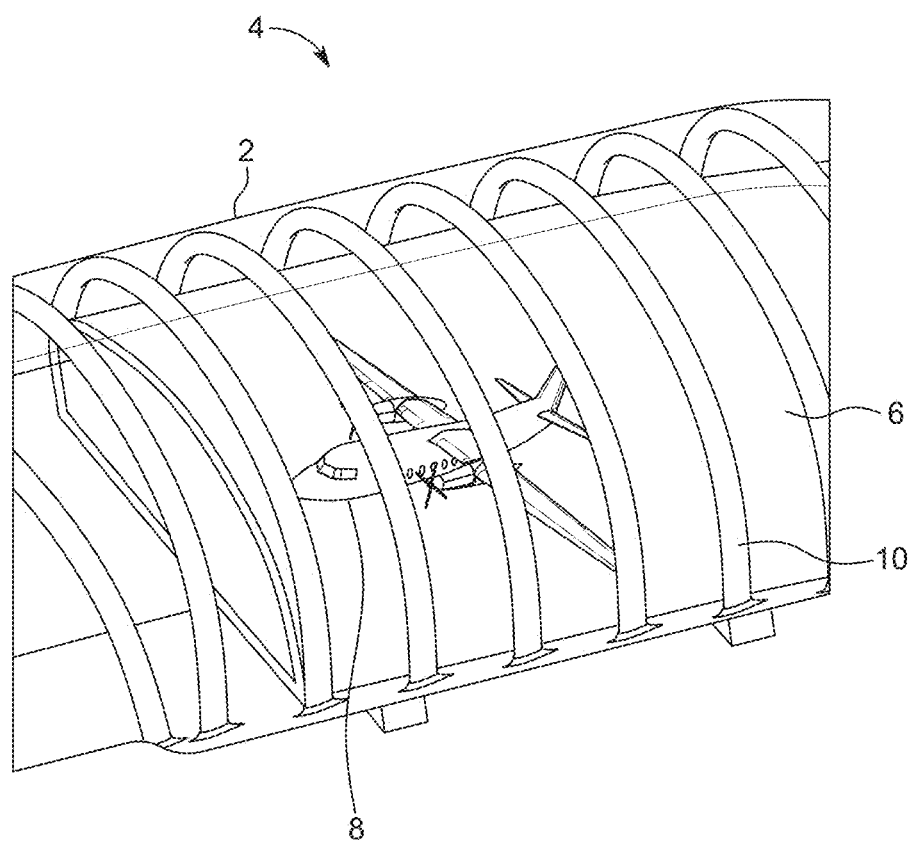
FIG. 4 illustrates a roofline of a structure formed by tubes for housing an article, according to one or more embodiments of the presently disclosed subject matter.
Figure 5:
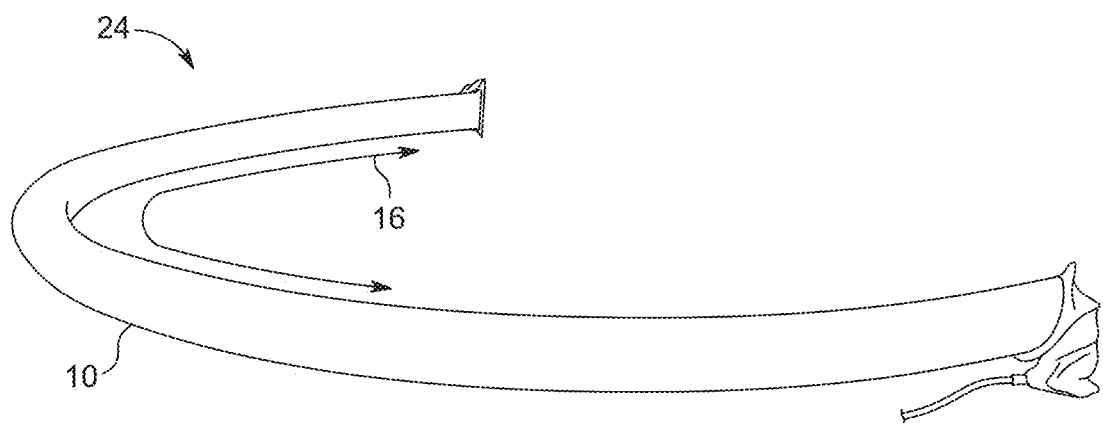
FIG. 5 is a perspective view of a seamless tube in an inflated state depicting a tubular arch shape woven to the correct shape and dimensions, according to one or more embodiments of the presently disclosed subject matter.

At least one embodiment of the presently disclosed subject matter is illustrated throughout the drawings and in particular reference to FIG. 3. Disclosed herein is a tube 10 for use in creating a support for a roof line 2 of a structure 4. FIG. 4 illustrates an example of a type of structure that can be erected with a plurality of tubes. The tube 10 includes an inner flexible bladder 12. The tube 10 also includes a middle reinforcing textile 14 formed from reinforcing textile fibers, which are generally perpendicular fibers oriented in the hoop 22 and axial 21 directions as illustrated in FIG. 3. These fibers are woven to form a seamless tubular arch shape 16. FIG. 5 illustrates the arch shape 16 according to one or more embodiments of the presently disclosed subject matter.

According to one or more embodiments of the presently disclosed subject matter, when inflation of the tube or cylinder is discussed, it is understood to mean inflating the inner flexible bladder once all three layers of the tube: the bladder, cylinder (or middle reinforcing textile), and weather shield are assembled together.

Perpendicular fibers are sometimes described as "straight" fibers because they run straight along their respective hoop (circumferential) 22 and axial (longitudinal) 21 directions. According to the presently disclosed subject matter, the fibers are not perpendicular (or straight) until after the tube is inflated. Because the tube is only used to carry load after inflation, it is important that the fibers are straight, meaning perpendicular, after inflation. In fact, according to the presently disclosed subject matter, the dimensions of a take-up roll required to make a tube of any desired dimension (which has straight fibers upon inflation), can be calculated using Equation 1 and Equation 2 below. According to the presently disclosed subject matter, the term "straight" fibers (or yarns) is intended to mean perpendicular fibers. For the purposes of the present disclosure, these terms are used interchangeably.

Figure 2:
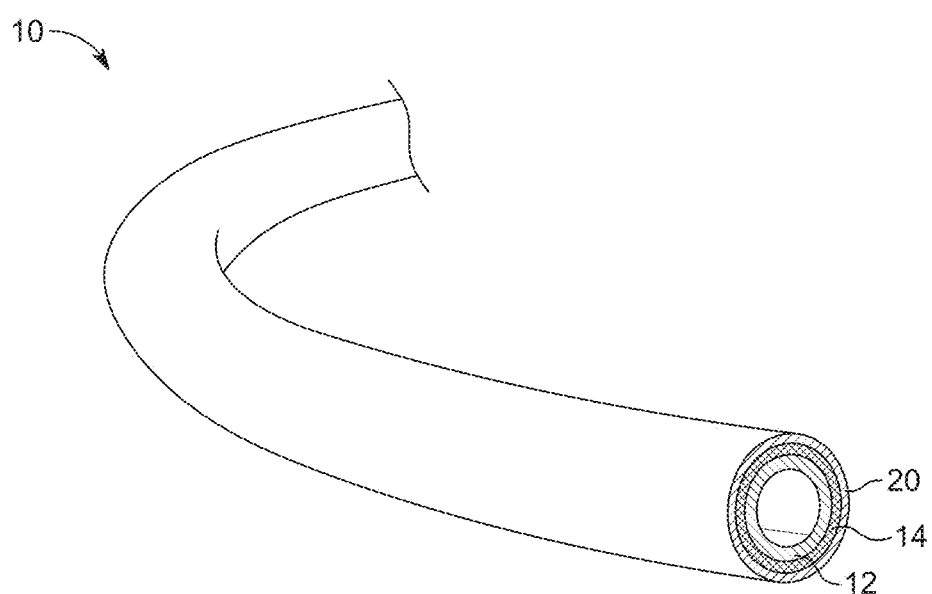
FIG. 2 is a perspective view of a tube, according to one or more embodiments of the presently disclosed subject matter.

FIG. 2 illustrates the different layers of the tube according to one or more embodiments of the presently disclosed subject matter. The middle reinforcing textile 14 is engaged with the flexible bladder 12. The tube 10 also includes an outer weather shield 20 coating engaged with the middle reinforcing textile 14. In operation, a plurality of tubes 10 are used to form the roof line 2 of a structure 4 to define a housing 6 for containing an article 8, as illustrated in FIG. 4.

According to one or more embodiments, the inner flexible bladder 12 is made from a thin elastomeric film capable of stretching while maintaining air tight integrity. Elastomeric refers to the rubber-like properties of a polymer, i.e., a material being able to regain its original configuration when a stress is removed from the material. Covalent cross-linkages within the elastomer ensure that it will return to its original configuration when the stress is removed. Without the cross-linkages, the applied stress would result in a permanent deformation. The elastomeric film can be made from one or more of any substances known or used in the art, including but not limited to, polyurethane, fluorosilicone, silicone, TPE, TPU, urethane, and ionomer cast film. In some embodiments, the elastomeric film of bladder 12 has a thickness of about 0.03 mm to 3.0 meters.

According to one or more embodiments, the middle reinforcing textile 14 is a seamless woven cylinder formed to approximate the arch shape 16 upon inflation. FIG. 5 illustrates the arch shape 16 according to one or more embodiments of the presently disclosed subject matter. Because the cylinder is seamless, it can be bent without kinking its fibers. This in turn increases its load bearing capabilities. FIG. 3 illustrates a weaving pattern used to make the cylinder strong and seamless. However, it should be appreciated that the weaving pattern is not limited to the structure shown in FIG. 3 and can be rotated in any direction to maintain generally or substantially perpendicular fibers upon inflation.

Figure 6:
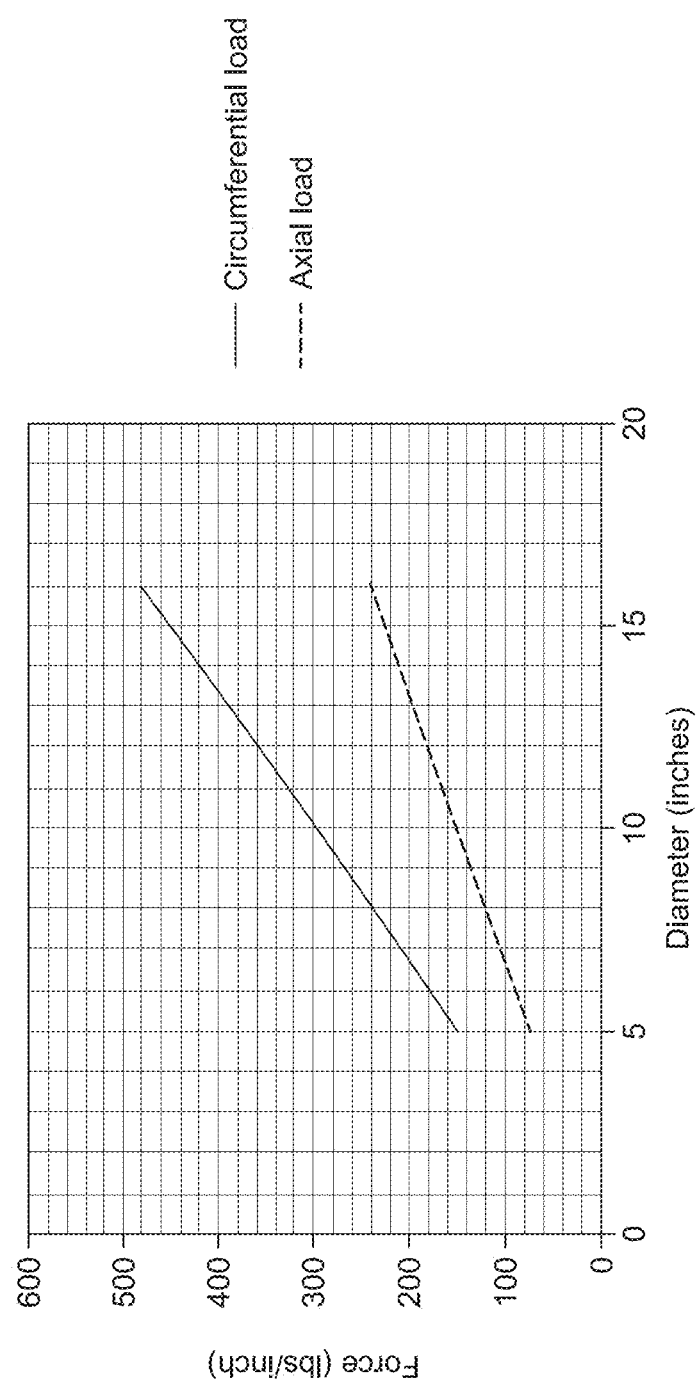
FIG. 6 is a graph, illustrating the relationship between force and tube diameter with respect to axial and circumferential loads, according to one or more embodiments of the presently disclosed subject matter.

According to one or more embodiments, the seamless woven cylinder is formed from straight fibers. Straight fibers are the most efficient fibers for carrying loads imposed by inflation. FIG. 6 illustrates the circumferential and axial loads placed on the fibers as a function of tube diameter at a given pressure. The higher the pressure and the larger the tube diameter, the higher the stresses will be on fibers. FIG. 6 illustrates that the circumferential fibers must carry approximately twice the load as the axial fibers.

Knitted fibers are formable and can be used, for example, instead of straight fibers. However, knitted fibers would not be straight in the final structure and therefore would not carry loads satisfactorily According to one or more embodiments, the seamless woven cylinder is made from one or more of the following substances: fiberglass, aramid, carbon, ceramic fiber, polyamide nylon, PET or PBT polyester, phenol-formaldehyde (PF), polyvinyl chloride fiber (PVC) vinyon, polyolefins (PP and PE) olefin fiber acrylic polyesters, aromatic polyamids (aramids), elastomers, polyurethane fiber, elastolefin, coextruded fibers, or other low specific gravity, high tenacity fibers. The cylinder can be made from one or more of any substances known or used in the art.

Figure 7:
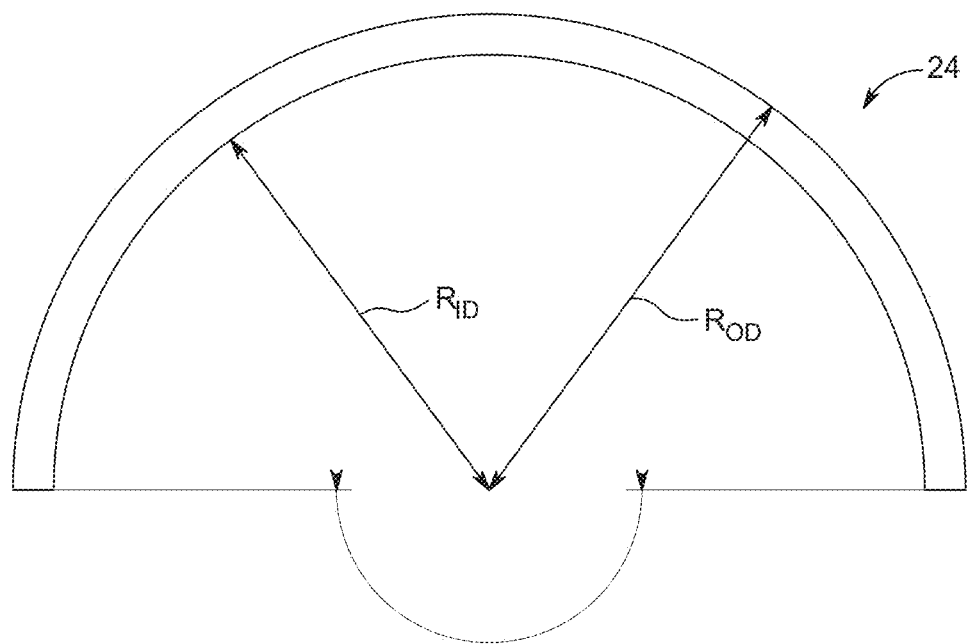
FIG. 7 depicts an outside arc radius and an inside arc radius of the tube in an inflated state, according to one or more embodiments of the presently disclosed subject matter.
Figure 8:
FIG. 8 depicts an inner tube radius, according to one or more embodiments of the presently disclosed subject matter.
Figure 9:
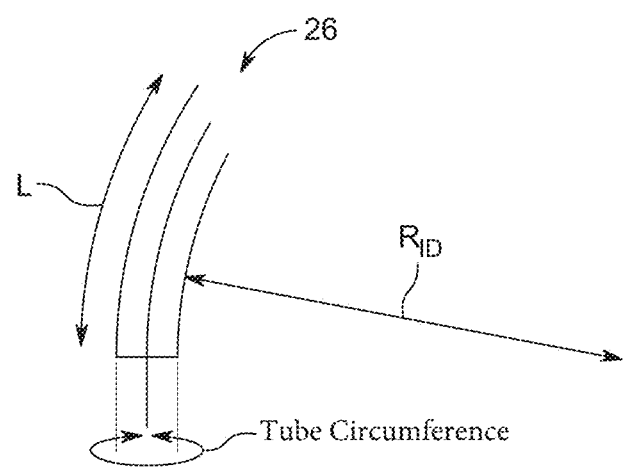
FIG. 9 depicts a distance along an inside circumference of the tube in a deflated state, according to one or more embodiments of the presently disclosed subject matter.

According to one or more embodiments, and as exemplified in FIGS. 7, 8 and 9, the seamless woven cylinder in an inflated state 24 defines an inside arc radius $R_{ID}$, an outside arc radius of $R_{OD}$, and an inner cylinder radius $R_T$, and a tube circumference of the seamless woven cylinder in a view 26.

According to one or more embodiments, the seamless tubular arch shape 16 has at least one Arc length (L) determined by equations:

$$L = \pi(R_{ID} + R_T - R_T \cos(S/R_T))$$  Equation 1 and $$L_{N+1}/L_N = D_{N+1}/D_{ID}.$$  Equation 2

Figure 10:
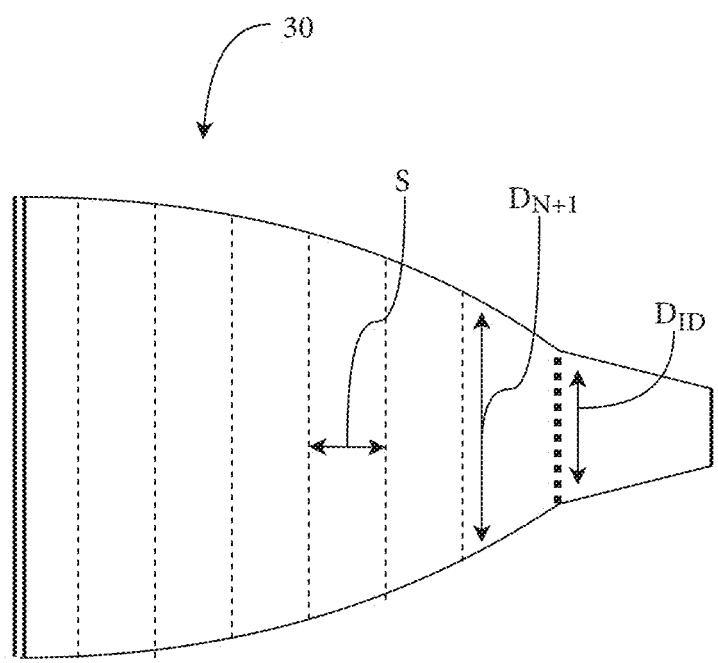
FIG. 10 depicts a take-up roll, according to one or more embodiments of the presently disclosed subject matter.
Figure 11:
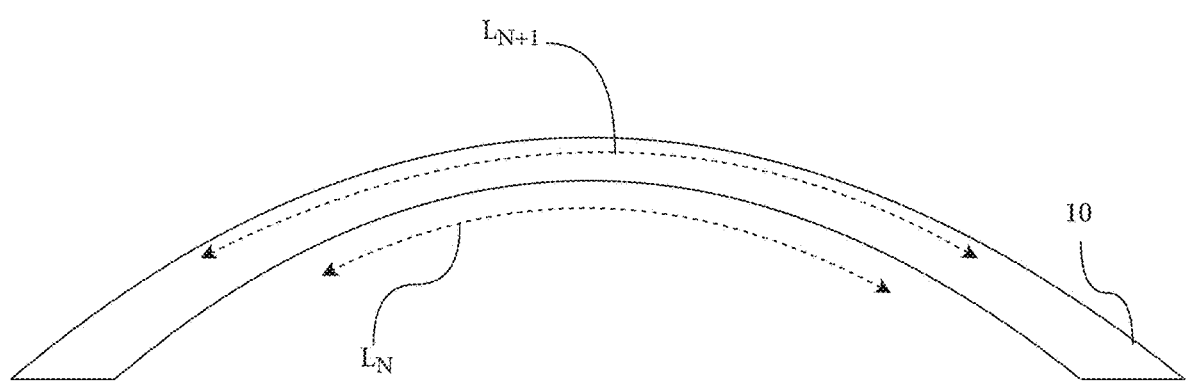
FIG. 11 depicts a tube having inner and outer half arc lengths, according to one or more embodiments of the presently disclosed subject matter.

According to FIG. 10, $D_{ID}$ is the narrowest diameter of the take-up roll 30 and $D_{N+1}$ is any larger diameter at a point further along the length of the take-up roll 30. As illustrated in FIG. 11, L is the half arc length of the tube, where $L_N$ is the half arc length at the most inside part of the tube and corresponds with $D_{ID}$ on the take-up roll 30. $L_{N+1}$ is the half arc length at a more outer point, moving from the inside to the outside of the tube, and corresponds with $D_{N+1}$ on the take-up roll 30. As illustrated in FIG. 10, S is a distance along the take-up roll length corresponding with an ID side of the flat, uninflated tube.

If the desired dimensions of a tube are known, then the dimensions of a take-up roll required to build such a tube can be calculated using Equation 1 and Equation 2 above.

The arc length (L) is illustrated in FIG. 9. Equation 1 and 2 can be used to design take-up roll dimensions that will create a fabric that accurately fits a desired arch contour while maintaining straight fibers when pressurized. Using this equation for a cosine curve, the dimensions of the take-up roll can be calculated per increment of machine or take-up roll width S.

The dimensions calculated can be used as a percentage of take-up roll diameter compared with a starting roll diameter $D_{ID}$ that will be determined by space limitations for mounting the take-up rolls on a weaving machine.

An example of the calculations for an arc shape with an inside radius of about 114 inches and an inflated tube radius of about 5.1 inches is shown in Table 1 below.

TABLE 1

| Inside Radius of Arc, $R_{ID}$ [in] | Tube Radius, $R_T$ [in] | Distance Along Take-Up Roll Length (from ID side of Flat Fabric), S [in] | $S/R_T$ | Length of Axial (half arc), L [in] as you move from the inside to the outside of the tube | $D_{N+1}/D_{ID}$ |
|---|---|---|---|---|---|
| 114 | 5.1 | 0.000 | 0.000 | 358.142 | 1.000 |
| 114 | 5.1 | 1.000 | 0.196 | 358.449 | 1.001 |
| 114 | 5.1 | 2.000 | 0.392 | 359.359 | 1.003 |
| 114 | 5.1 | 3.000 | 0.588 | 360.835 | 1.008 |
| 114 | 5.1 | 4.000 | 0.784 | 362.823 | 1.013 |
| 114 | 5.1 | 5.000 | 0.980 | 365.245 | 1.020 |
| 114 | 5.1 | 6.000 | 1.176 | 368.009 | 1.028 |
| 114 | 5.1 | 7.000 | 1.373 | 371.009 | 1.036 |
| 114 | 5.1 | 8.000 | 1.569 | 374.130 | 1.045 |
| 114 | 5.1 | 9.000 | 1.765 | 377.252 | 1.053 |
| 114 | 5.1 | 10.000 | 1.961 | 380.256 | 1.062 |
| 114 | 5.1 | 11.000 | 2.157 | 383.026 | 1.069 |
| 114 | 5.1 | 12.000 | 2.353 | 385.457 | 1.076 |
| 114 | 5.1 | 13.000 | 2.549 | 387.455 | 1.082 |
| 114 | 5.1 | 14.000 | 2.745 | 388.944 | 1.086 |
| 114 | 5.1 | 15.000 | 2.941 | 389.866 | 1.089 |
| 114 | 5.1 | 16.000 | 3.137 | 390.187 | 1.089 |

The column to the right shows the percent increase in take-up roll diameter over the narrowest roll diameter $D_{ID}$.

According to one or more embodiments, the outer weather shield 20 coating is made from a polymer to prevent intrusion from dust, dirt, and weather. The polymer can be made from one or more of any substances known or used in the art, including but not limited to, low-density polyethylene (LDPE), high-density polyethylene (HDPE), polypropylene (PP), polyvinyl chloride (PVC), polystyrene (PS), nylon, polytetrafluoroethylene, thermoplastic polyurethanes (TPU), polysiloxane, polyphosphazene, polyisoprene, polychloroprene fluorosilicone, silicone, TPE, urethane, and ionomer cast film.

Disclosed herein is a method of creating a support for a roof line 2 of a structure 4. The method includes providing a tube 10 having an inner flexible bladder. The tube 10 also includes a middle reinforcing textile 14 formed from reinforcing textile fibers 22 and 21 woven to form a seamless tubular arch shape 16. The middle reinforcing textile 14 is engaged with the flexible bladder. The tube 10 also includes an outer weather shield 20 coating engaged with the middle reinforcing textile 14. The method also includes inflating a plurality of tubes 10. The method also includes arranging the plurality of tubes 10 to form the roof line 2 of a structure 4 to define a housing 6 for containing an article 8. As shown in FIG. 4, the inflated tubes are erected parallel to one another and separated by a distance, for example about 10 ft. The tubes may be attached to one another and also to the ground. A tarp for roofing as well as side wall protection can be draped over the arched tubes, and affixed to the arches.

According to one or more embodiments, the inner flexible bladder 12 is made from a thin elastomeric film capable of stretching while maintaining air tight integrity. The elastomeric film can be made from one or more of any substances known or used in the art, including but not limited to, polyurethane, fluorosilicone, silicone, TPE, TPU, urethane, and ionomer cast film.

According to one or more embodiments, the middle reinforcing textile 14 is a seamless woven cylinder formed to approximate the arch shape 16 upon inflation. Because the cylinder is seamless, it can be bent without kinking its fibers. This in turn increases its load bearing capabilities. The arch shape of the present disclosure is achieved without the use of external, longitudinal structures such as bars or slats, which are required in inferior systems to create the desired arch shape and to assist in carrying axial loads.

According to one or more embodiments, the seamless woven cylinder is formed from straight fibers. Straight fibers are the most efficient fibers for carrying loads imposed by inflation. Knitted fibers could be used, for example, as they are formable, however they would not be straight in the final structure and therefore would not carry loads satisfactorily.

According to one or more embodiments, the seamless woven cylinder in an inflated state 24 defines an inside arc radius $R_{ID}$, an outside arc radius of $R_{OD}$, an inner cylinder radius $R_T$, and tube circumference of the seamless woven cylinder in view 26.

According to one or more embodiments, the seamless tubular arch shape 16 has at least one Arc length (L) determined by an equation $L=\pi(R_{ID}+R_T-R_T \cos(S/R_T))$.

According to one or more embodiments, the outer weather shield 20 coating is made from a polymer to prevent intrusion from dust, dirt, and weather. The polymer can be made from one or more of any substances known or used in the art, including but not limited to, low-density polyethylene (LDPE), high-density polyethylene (HDPE), polypropylene (PP), polyvinyl chloride (PVC), polystyrene (PS), nylon, polytetrafluoroethylene, thermoplastic polyurethanes (TPU), polysiloxane, polyphosphazene, polyisoprene, polychloroprene fluorosilicone, silicone, TPE, urethane, and ionomer cast film.

According to one or more embodiments, the seamless woven cylinder is made from one or more of the following substances: fiberglass, aramid, carbon, ceramic fiber, polyamide nylon, PET or PBT polyester, phenol-formaldehyde (PF), polyvinyl chloride fiber (PVC) vinyon, polyolefins (PP and PE) olefin fiber acrylic polyesters, aromatic polyamids (aramids), elastomers, polyurethane fiber, elastolefin, coextruded fibers, or other low specific gravity, high tenacity fibers. The cylinder can be made from one or more of any substances known or used in the art.

The use of shuttle loom weaving technology and the teachings of this disclosure will allow one piece, seamless construction of a properly contoured fabric. No additional straps will need to be added to the exterior circumference for axial load carrying capability. Weaving machines using the disclosed technology operate on a fraction of the floor space required by braiding. Weaving is essentially a continuous process where there is no need to frequently stop the machine to replace fibers. The limiting aspect of machine thru-put is the length of warp fibers that can be fed to the machine. In a production mode, feeding the machine would be required on an average of once per week or less, not once every few hours as is required by braiding. The technology is applicable to any yarn material. Materials of interest for the airbeam applications mentioned include, but are not limited to aramid, polyester, nylon and any other high strength, light weight reinforcing fibers.

The subject matter disclosed herein is directed towards an inflatable, arch shaped, seamless tube that can be used as a load carrying structure such as an arch. One advantageous feature of this tube includes the fact that the inflated arch shaped structure does not require rigidizing resins to be applied to allow load bearing capability. The strength of the tube is achieved because of the tube's design, which creates perpendicularly oriented axial and hoop direction fibers, after the tube in inflated and assumes an arch shape.

Another unique feature is the use of a specifically designed take-up roll, on a shuttle type weaving machine, to generate the desired arc shape and dimensions. A variety of arch shapes and dimensions can be fabricated by simply re-designing the loom take-up roll. The structure can be inflated and used in combination with additional inflated arches to form a roof line for a shelter, etc. The inflated structures of the present disclosure can also be deflated, relocated and re-inflated as might be the case in military applications for soldier housing and the like.

The primary component of the inflated tube is a seamless, tubular woven fabric with fibers oriented in two directions for maximum load carrying efficiency. Specifically fibers are oriented in the hoop direction of the tube for maximum inflation pressure load carrying capability and axially along the length of the arch, parallel with the centerline of the shaped tube, for bending stiffness of the inflated tube.

The seamless woven fabric tube can be woven on a shuttle loom where warp yarns or fibers will form the axial yarn direction reinforcements (yarns that run parallel to the centerline of the arch shaped tube) and the shuttle will insert weft yarns that will be oriented in the hoop direction of the tube. For the purposes of the present disclosure, the terms "yarns" and "fibers" are used interchangeably.

The seamless tube comes off the loom as a flattened fabric tube where the width of the flattened fabric tube is one half of the desired circumference of the inflated circular cross section tube. A weaving loom has a take up roll that pulls the woven fabric warp yarns ahead incrementally with each machine cycle and insertion of a weft yarn. With a conventional loom take up roll, i.e. one that is a right circular cylinder, the loom would produce a straight seamless tube of "continuous" length. An advantage of the presently described subject matter is that a specifically shaped loom take up roll can be designed where each machine cycle and incremental rotation of the take up roll advances the fabric. The fabric will advance at different rates across the width of the fabric depending on the diameter of the shaped take up roll in contact with the advancing fabric. The shaped take up roll is effectively pulling the warp yarns ahead at a rate that coincides with the take up roll diameter at that fabric width position. The warp yarns intended to be at the arch ID need to be shorter than those at the OD, for example. The take up roll advances warp yarns (yarns that will ultimately take position along the length of the curved arch at individual axial positions spaced around the circumference) at the correct length with respect to each other so that an arch of the proper shape and dimensions is created. The take-up roll can be designed in advance with the shape and dimensions of the finished, inflated tube in mind.

According to the presently disclosed subject matter, no post weaving bending, shaping or rigidization with resin is necessary for the inflated structure to take and hold the desired shape and dimensions. In this manner, the structure can be deflated and relocated and re-inflated.

To complete the useful structure desired, an internal bladder needs to be added to the interior of the woven item to contain inflation air and transfer the air pressure load to the fabric tube because the fabric is porous. The fabric, however is designed to carry the pressure loads as transmitted by the internal bladder. The third element of the useful structure is an environmental barrier coating applied to the exterior of the seamless fabric tube to protect it from weather, dirt, debris, etc. The internal bladder and the external coating will not prevent the structure from being deflated and relocated and re-inflated.

Previous methods require that an inflated mold assembly be bent around a formwork with external force applied, and then rigidified. Once rigidified with resin, the structure cannot be deflated and re-inflated and therefore is substantially less versatile and less portable. The tube of the presently disclosed subject matter requires no external force, and no rigidifying, and is therefore more versatile and less portable.

With previous methods, a braiding process applies hoop-like fibers at some angle other than 90 degrees to the central axis of the structure. True hoop fiber reinforcement, 90 degrees to the central axis of the structure, as in the presently disclosed subject matter, will be most effective in carrying internal pressure loads. Being able to carry high internal pressures is key to maximizing structural load carrying capability. Previous methods develop load carrying capability thru load transfer capability between reinforcing fibers and the rigidizing resin. These previous methods not lend themselves to light weight and portability.

In previous methods, tube structures are only rigid and load carrying when made rigid with the introduction and curing of a resin. In the presently disclosed subject matter, the internal bladder cannot be removed as it transfers the internal inflation pressure to the fabric for load carrying. This also enables the deflation and re-inflation.

The presently disclosed subject matter requires a different fabric design for each different arch design so that the longitudinal yarns are woven to the exact lengths required for each different arch dimensions. A single fabric design, as used in previously known methods, cannot be optimum for all or many arch dimension applications.

Previously known methods require outside force to urge the tubes to form the desired shape. This differs from the presently disclosed subject matter in that in the present disclosure, no external force is required to form the desired shape. In the present disclosure, the final shape has been pre-defined by the weaving process where only internal pressure is required for the arch shape to be realized.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A tube for use in creating a support for a roof line of a structure, the tube comprising:
   an inner flexible bladder;
   a seamless woven cylinder formed from fibers woven to form a seamless tubular arch shape when the cylinder is inflated, the cylinder engaged with the flexible bladder, wherein the fibers are substantially perpendicular along axial and hoop directions; and
   an outer weather shield coating engaged with the cylinder, wherein, in operation a plurality of tubes are used to form the roof line of a structure to define a housing for containing an article, wherein the plurality of tubes maintains flexibility so that the plurality of tubes can be inflated, deflated, and re-deployed.

2. The tube of claim 1, wherein the inner flexible bladder is made from a thin elastomeric film capable of stretching while maintaining airtight integrity.

3. The tube of claim 2, wherein the inner flexible bladder is fixedly engaged with the cylinder when the cylinder is an inflated state.

4. The tube of claim 2, wherein the inner flexible bladder is removable when the cylinder is in a deflated state.

5. The tube of claim 1, wherein the seamless woven cylinder in an inflated state defines an inside arc radius $R_{ID}$, an outside arc radius of $R_{OD}$, an inner cylinder radius $R_T$.

6. The tube of claim 5, wherein the seamless tubular arch shape has at least one half arc length (L) determined by an equation $L=\pi(R_{ID}+R_T-R_T \cos(S/R_T))$.

7. The tube of claim 1, wherein the outer weather shield coating is made from a polymer to prevent intrusion from dust, dirt, and weather.

8. The tube of claim 1, wherein the seamless woven cylinder is made from one or more of the following substances: Fiberglass, Aramid, carbon, ceramic fiber, polyamide nylon, PET or PBT polyester, phenol-formaldehyde (PF), polyvinyl chloride fiber (PVC) vinyon, polyolefins (PP and PE) olefin fiber acrylic polyesters, aromatic polyamids (aramids), Elastomers, polyurethane fiber, Elastolefin, or Coextruded fibers.

9. A method of creating a support for a roof line of a structure, comprising:
   providing a tube comprising:
      an inner flexible bladder;
      a seamless woven cylinder formed from fibers woven to form a seamless tubular arch shape when the cylinder is inflated, the cylinder engaged with the flexible bladder, wherein the fibers are substantially perpendicular along axial and hoop directions; and
      an outer weather shield coating engaged with the cylinder;
   inflating a plurality of tubes;
   arranging the plurality of tubes to form the roof line of a structure to define a housing for containing an article;
   deflating the plurality of tubes; and
   re-inflating the plurality of tubes.

10. The method of claim 9, wherein the inner flexible bladder is made from a thin elastomeric film capable of stretching while maintaining airtight integrity.

11. The method of claim 9, wherein the inner flexible bladder is fixedly engaged with the cylinder when the cylinder is an inflated state.

12. The method of claim 9, wherein the inner flexible bladder is removable when the cylinder is in a deflated state.

13. The method of claim 9, wherein the seamless woven cylinder in an inflated state defines an inside arc radius $R_{ID}$, an outside arc radius of $R_{OD}$, an inner cylinder radius $R_T$.

14. The method of claim 13, wherein a ratio of half arc lengths $L_N$ and $L_{N+1}$ of the tube is proportional to a ratio of diameters $D_{ID}$ and $D_{N+1}$ of a take-up roll configured to create the tube, wherein $L_{N+1}/L_N = D_{N+1}/D_{ID}$, wherein $L_N$ and $L_{N+1}$ can be calculated using a formulae $L = \pi(R_{ID} + R_T - R_T \cos(S/R_T))$, wherein S is a distance between $D_{ID}$ and $D_{N+1}$ along the take-up roll.

15. The method of claim 9, wherein the outer weather shield coating is made from a polymer to prevent intrusion from dust, dirt, and weather.

16. The method of claim 9, wherein the seamless woven cylinder is made from one or more of the following substances: Fiberglass, Aramid, carbon, ceramic fiber, polyamide nylon, PET or PBT polyester, phenol-formaldehyde (PF), polyvinyl chloride fiber (PVC) vinyon, polyolefins (PP and PE) olefin fiber acrylic polyesters, aromatic polyamids (aramids), Elastomers, polyurethane fiber, Elastolefin, or Coextruded fibers.

* * * * *